US012536921B2

(12) United States Patent
Karpelson et al.

(10) Patent No.: US 12,536,921 B2
(45) Date of Patent: Jan. 27, 2026

(54) SEGMENTED ALPHANUMERIC DISPLAY USING ELECTROMAGNETIC MICROACTUATORS

(71) Applicant: President and Fellows of Harvard College, Cambridge, MA (US)

(72) Inventors: Michael Karpelson, Newton, MA (US); Rut Maria Pena Velasco, Cambridge, MA (US); Robert J. Wood, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 976 days.

(21) Appl. No.: 17/764,234

(22) PCT Filed: Oct. 1, 2020

(86) PCT No.: PCT/US2020/053681
§ 371 (c)(1),
(2) Date: Mar. 28, 2022

(87) PCT Pub. No.: WO2021/067533
PCT Pub. Date: Apr. 8, 2021

(65) Prior Publication Data
US 2022/0375366 A1 Nov. 24, 2022

Related U.S. Application Data

(60) Provisional application No. 62/908,971, filed on Oct. 1, 2019.

(51) Int. Cl.
*G09B 21/00* (2006.01)
*G04B 25/02* (2006.01)
(Continued)

(52) U.S. Cl.
CPC .......... *G09B 21/004* (2013.01); *G04B 25/02* (2013.01); *H02K 1/22* (2013.01); *H02K 7/14* (2013.01); *H05K 5/0017* (2013.01)

(58) Field of Classification Search
None
See application file for complete search history.

(56) References Cited

U.S. PATENT DOCUMENTS 3,648,647 A * 3/1972 Joy .......................... G04F 3/00
368/230
3,732,561 A 5/1973 McGinnis
(Continued)

FOREIGN PATENT DOCUMENTS

WO WO-2006007713 A1 * 1/2006 ............. H02K 7/081
WO 2011107982 A1 9/2011

OTHER PUBLICATIONS

Ledex Linear and Rotary Solenoids catalog obtained from https://web.archive.org/web/20190214174030if_/http://www.ermec.com/catalogos/2010/CAT-JOHNSON-ERMEC-CATALOGO-SOLENOIDES-LEDEX-electroimanes-DC-lineales-y-rotativos-mono-y-biestables.pdfendex Lin. Pub. Apr. 8, 2012 (Year: 2012).*
(Continued)

*Primary Examiner* — Xuan M Thai
*Assistant Examiner* — Andrew Bodendorf
(74) *Attorney, Agent, or Firm* — Modern Times Legal; Robert J. Sayre

(57) ABSTRACT

A segmented alphanumeric includes a display panel, at least one linearly actuated platform, and display elements. Each display element passes through an orifice in the display panel to generate protruded and segmented alphanumeric characters in combination with other extended display elements. A microactuator array is displaceable by the linearly actuated platform and includes electromagnets and rotors. Each rotor is mounted for rotation in at least one direction
(Continued)

between an active state and an inactive state by at least one associated electromagnet. Each display element is displaced through the orifice by actuation of the linearly actuated platform via a respective rotor when the respective rotor is rotated into its active state and to evade displacement by the rotor when the rotor is rotated into its inactive state.

25 Claims, 12 Drawing Sheets

(51) Int. Cl.
*H02K 1/22* (2006.01)
*H02K 7/14* (2006.01)
*H05K 5/00* (2025.01)

(56) References Cited

U.S. PATENT DOCUMENTS

| | | | | |
|---|---|---|---|---|
| 4,161,832 A * | 7/1979 | Bergamini | ............... | G09F 9/30 40/449 |
| 4,912,442 A * | 3/1990 | Black | ............... | G08B 5/30 40/473 |
| 5,311,487 A * | 5/1994 | Mininni | ............... | G04G 9/08 368/230 |
| 5,592,037 A * | 1/1997 | Sickafus | ............... | H02K 99/00 310/40 MM |
| 5,719,561 A * | 2/1998 | Gonzales | ............... | G08B 6/00 340/407.1 |
| 6,109,922 A * | 8/2000 | Litschel | ............... | G09B 21/004 434/114 |
| 6,359,550 B1 * | 3/2002 | Brisebois | ............... | H04M 19/04 340/407.1 |
| 7,079,454 B2 * | 7/2006 | Wellen | ............... | G04B 25/02 368/230 |
| 8,483,018 B2 * | 7/2013 | Anderson | ............... | G09B 21/003 368/230 |
| 9,105,198 B2 * | 8/2015 | Habas | ............... | G09B 21/003 |
| 9,658,600 B1 * | 5/2017 | Jeon | ............... | G04B 25/02 |
| 10,772,394 B1 * | 9/2020 | Michalske | ............... | G04G 21/025 |
| 2003/0132915 A1 | 7/2003 | Mitchell | | |
| 2005/0135198 A1 * | 6/2005 | Wellen | ............... | G04G 21/00 368/230 |
| 2006/0012576 A1 * | 1/2006 | Hafez | ............... | G09B 21/004 345/173 |
| 2012/0319981 A1 * | 12/2012 | Habas | ............... | G09B 21/008 345/173 |
| 2013/0149674 A1 * | 6/2013 | Anderson | ............... | G09B 21/004 434/114 |
| 2015/0206453 A1 * | 7/2015 | Yip | ............... | G09B 21/003 434/113 |
| 2019/0073923 A1 * | 3/2019 | Kim | ............... | G09B 21/004 |
| 2019/0304340 A1 * | 10/2019 | Bailey | ............... | B41M 3/16 |
| 2019/0312474 A1 * | 10/2019 | Fletcher | ............... | H02K 21/028 |
| 2019/0355276 A1 * | 11/2019 | Rami | ............... | G09B 21/009 |
| 2019/0385483 A1 * | 12/2019 | Cohen | ............... | G09B 21/02 |

OTHER PUBLICATIONS

USPTO, International Search Report and Written Opinion for PCT/US20/53681 (Jan. 21, 2021).

Z. Szabo, et al., "Development of Wearable Micro-Actuator Array for 3-D Virtual Tactile Displays," Journal of Electromagnetic Analysis and Applications 220-226 (Jun. 1, 2012).

* cited by examiner

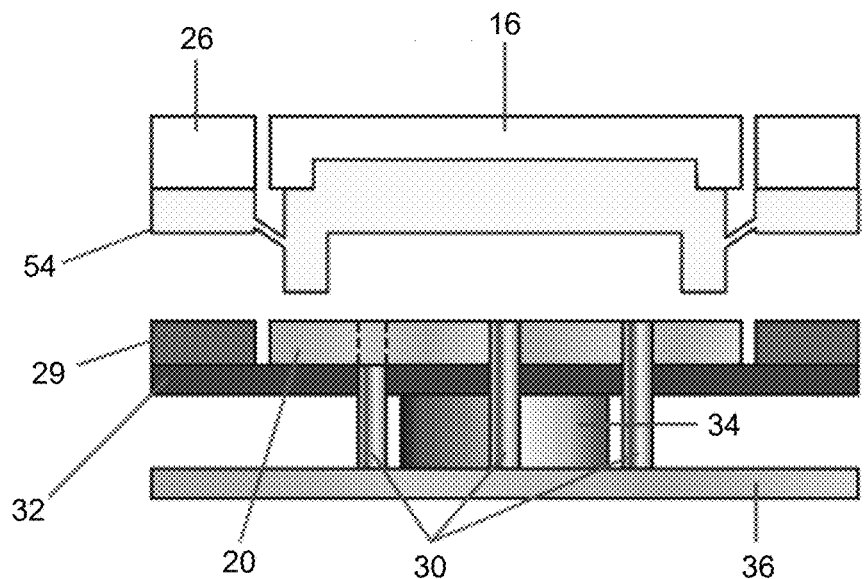
FIG. 13
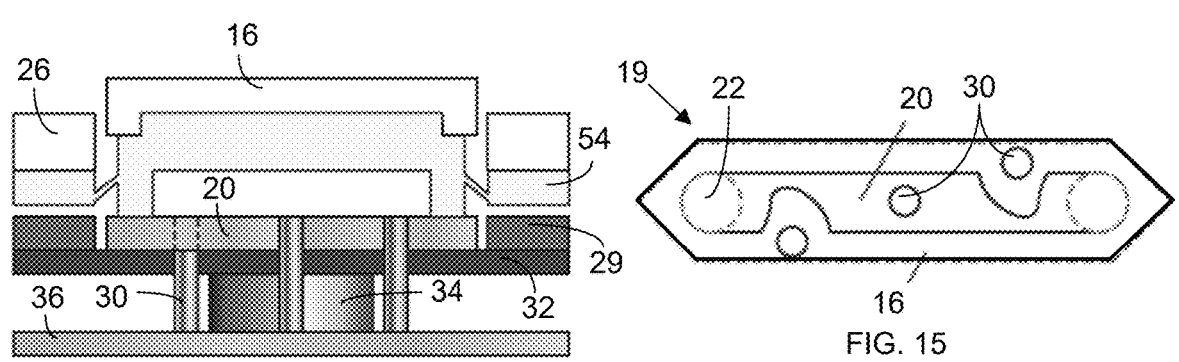
FIG. 14
FIG. 15
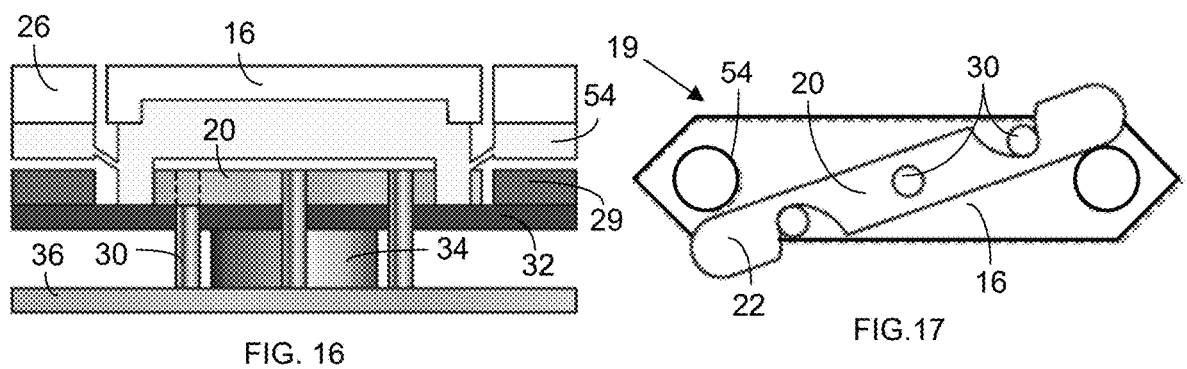
FIG. 16
FIG. 17

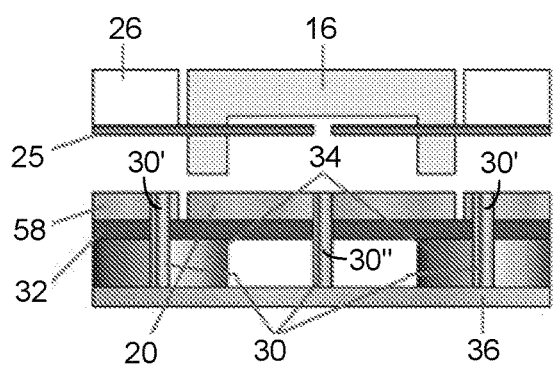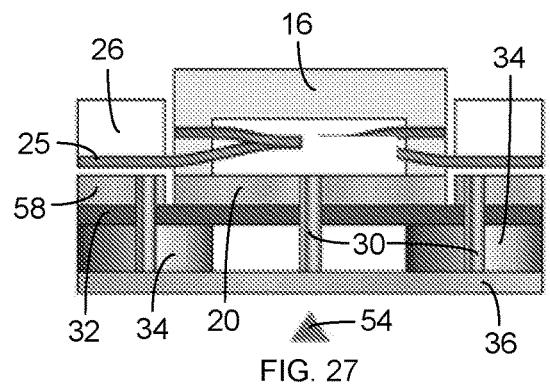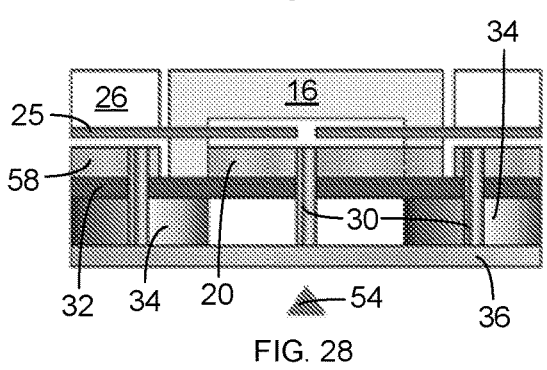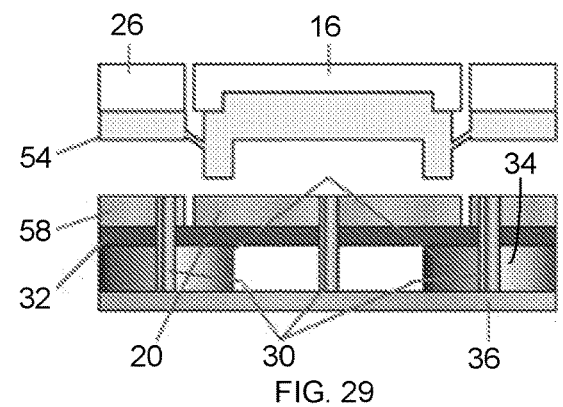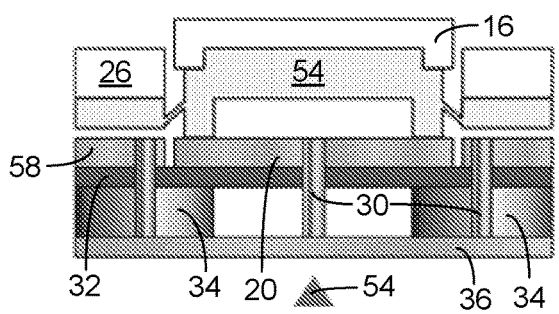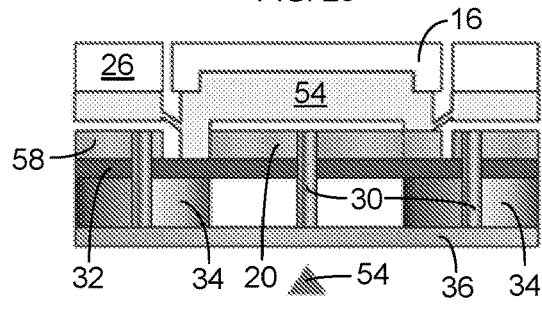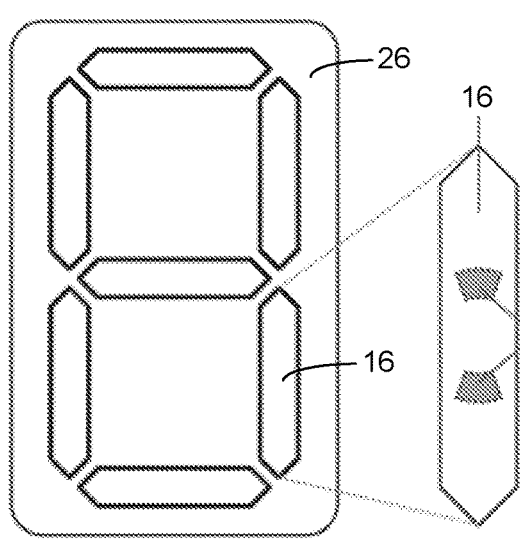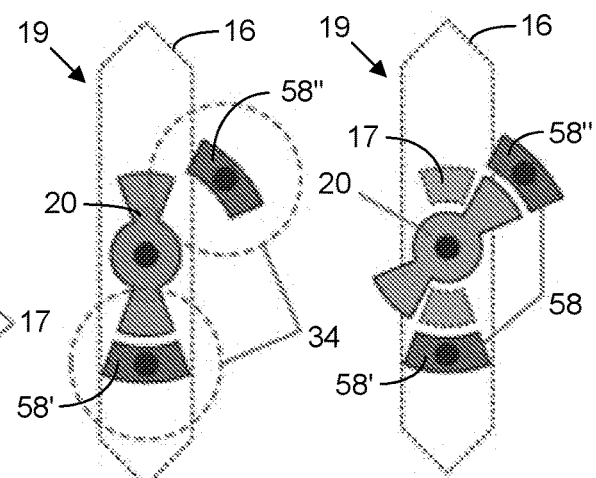

SEGMENTED ALPHANUMERIC DISPLAY USING ELECTROMAGNETIC MICROACTUATORS

BACKGROUND

The discussion of the background state of the art, discussed below, may reflect hindsight gained from the disclosed invention(s); and these characterizations are not necessarily admitted to be prior art.

In 2015, there were an estimated 36 million blind people in the world, with an additional estimated 217 million suffering from moderate to severe vision impairment. Over 80% of the visually impaired were older than 50, and this percentage is expected to rise in coming years due to a globally aging population.

Assistive technology allows visually impaired individuals a greater degree of independence and enables a higher quality of life. For the healthcare system, reducing the need for institutional care significantly lowers the economic burden of elder care, and many assistance programs are funded to support and incentivize the use of assistive technologies.

The vast majority of innovation in tactile devices for the blind—as reflected in academic publications, patent literature, and media coverage—pertains to braille. However, due to the difficulty of learning an entirely new means of communication, braille is rarely adopted by the elderly. As a result, most assistive technology for vision loss in later life relies on adding audio capabilities to existing devices. Although audio feedback can provide a high density of information, there are use cases where it fails to meet key needs among the blind and visually impaired population.

A number of surveys and studies have shown that individuals with visual impairments prefer not to draw attention to their disability, attributing this to embarrassment, desire for privacy, and safety concerns; this aversion limits the adoption of talking or voice-activated products. Among seniors, this limitation is further compounded by the comorbidity of vision and hearing loss, which increases with age; estimates of the prevalence of dual sensory impairment range from 9% to 21% in individuals over 70 years old. Likewise, audio devices cannot meet the needs of deaf-blind individuals in younger age brackets, who represent a small but substantially under-served demographic within the visually impaired population.

Multi-segment displays (see FIG. 1, which shows, from left-to-right, 7-, 9-, 14-, and 16-segment versions) are ubiquitous in electronic devices and appliances, and can include arrays 10 of segments 12 that can be activated to represent symbols ranging from the basic set of numbers plus some letters (7-segment) to the entire set of alphanumeric characters in languages based on Roman or Cyrillic script (16-segment). Unlike Braille, there is no learning curve associated with segmented displays; and, furthermore, a tactile version can simultaneously provide both visual and tactile information; such multi-modal devices may be particularly useful to individuals with partial or degenerative impairment and are equally usable by caregivers and other family members. At the same time, segmented displays have significantly fewer individual elements than equivalent dot matrix displays, which is directly relevant to device cost (e.g., most refreshable 8-dot Braille displays cost in the range of $75-100 per character).

SUMMARY

A segmented alphanumeric display using electromagnetic microactuators and a method for generating segmented alphanumeric characters are described herein, where various embodiments of the apparatus and methods may include some or all of the elements, features and steps described below.

A segmented alphanumeric display using electromagnetic microactuators can include a display panel, at least one linearly actuated platform, and a plurality of display elements positioned for selective displacement by the linearly actuated platform. Each display element is configured and positioned to pass through an orifice in the display panel and to extend beyond the outer surface of the display panel and retract into the display panel through the orifice and to generate protruded and segmented alphanumeric characters in combination with other extended display elements. A microactuator array is displaceable by the linearly actuated platform. The micro-actuator array includes a plurality of electromagnets and a plurality of rotors. Each rotor is mounted for rotation in a rotational plane and in at least one direction between an active state and an inactive state by at least one associated electromagnet from among the plurality of electromagnets when the respective electromagnet generates a magnetic field. Each display element is positioned to be displaced through the orifice by actuation of the linearly actuated platform via a respective rotor from among the plurality of rotors along an axis orthogonal to the rotational plane of its respective rotor when the respective rotor is rotated into its active state and to evade displacement by the rotor when the rotor is rotated into its inactive state.

A method for generating segmented alphanumeric characters utilizes a segmented alphanumeric display that comprises a display panel defining at least one orifice; at least one linearly actuated platform; a plurality of display elements; and a microactuator array, including a plurality of electromagnets and a plurality of rotors. Each rotor is associated with a respective electromagnet, and at least some of the electromagnets are energized to rotate the respective rotors associated with the energized electromagnets between an inactive state and an active state. The linearly actuated platform is displaced to displace the microactuator array toward the display panel, wherein rotors that are rotated to their active state displace an associated display element from the plurality of display elements through the orifice to protrude beyond the display panel. The protruding display elements collectively form a segmented alphanumeric character.

We believe that a low-cost segmented tactile display, as described herein, can address important unmet needs in a growing subset of the blind and visually impaired community and that production of such displays at low cost can enable widespread adoption. The designs described herein can be used to effectively serve the blind or visually impaired. The entire display can be activated by one or more high-force, high-displacement actuators (mesoactuators), while the on-state or off-state of each individual display element can be determined by an associated low-force, low-displacement actuator (microactuator). The microactuators can be co-fabricated in an array (actuation layer) that moves prismatically with respect to the display layer, having an active position where the microactuators are in close contact with their respective display elements in the display layer, and an inactive position where the microactuators are spatially separated from their respective display elements in the display layer.

BRIEF DESCRIPTION OF THE DRAWINGS

In FIG. 7 (i.e., the active state), activating the display will push the display element 16 out of the display surface. In FIG. 8 (i.e., the inactive state), the display element 16, because its protrusion 17 is not aligned with the rotor 20, will remain flush with the display surface.

FIG. 13 is a cross-sectional side view of the elastomeric keypad assembly of FIG. 10.

FIGS. 14 and 15, respectively, are a cross-sectional side view and a top view of the elastomeric keypad assembly of FIGS. 12 and 13 with the rotor 20 and display 16 aligned in the active state.

FIGS. 16 and 17, respectively, are a cross-sectional side view and a top view of the elastomeric keypad assembly of FIGS. 12-15 with the rotor 20 and display element 16 aligned in the inactive state.

FIGS. 26-28 provide a side view of a two-coil embodiment of an elastomeric keypad assembly with a flat spring 25. The assembly is shown subject to an underlying force 54 from a mesoactuator in FIGS. 27 and 28. The display element 16 is active in FIG. 27 and inactive in FIG. 28.

FIGS. 29-31 provide a side view of a two-coil embodiment of an elastomeric keypad assembly with an elastomer spring 54. The assembly is shown subject to an underlying force 54 from a mesoactuator in FIGS. 30 and 31. The display element 16 is active in FIG. 30 and inactive in FIG. 31.

FIG. 32 is a top view showing a display panel 26 with an excerpted view of a display element 16.

FIGS. 33 and 34 provide top views showing a simplified rotor 20 and pole piece 58 design.

Figure 1:
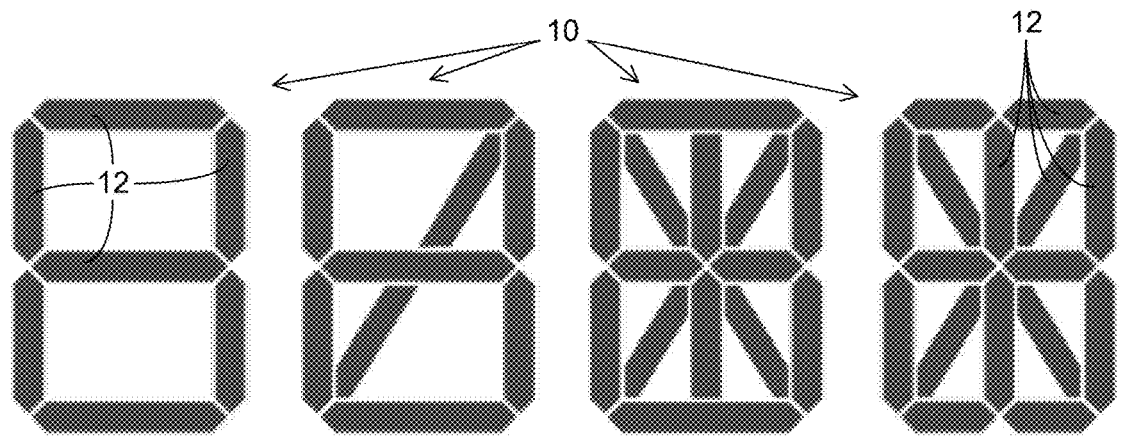
FIG. 1 shows, from left-to-right, 7, 9, 14, and 16-segment versions of segmented displays.

In the accompanying drawings, like reference characters refer to the same or similar parts throughout the different views; and apostrophes, if used, differentiate multiple instances of the same item or different embodiments of items sharing the same reference numeral. The drawings are not necessarily to scale; instead, an emphasis is placed upon illustrating particular principles in the exemplifications discussed below. For any drawings that include text (words, reference characters, and/or numbers), alternative versions of the drawings without the text are to be understood as being part of this disclosure; and formal replacement drawings without such text may be substituted therefor.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially (though not perfectly) pure, as practical and imperfect realities may apply; e.g., the potential presence of at least trace impurities (e.g., at less than 1 or 2%) can be understood as being within the scope of the description. Likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at ambient pressure (e.g., about 50-120 kPa—for example, about 90-110 kPa)

and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. The term, "about," can mean within ±10% of the value recited. In addition, where a range of values is provided, each subrange and each individual value between the upper and lower ends of the range is contemplated and therefore disclosed.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as those introduced with the articles, "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

The design of multi-element tactile displays is subject to conflicting objectives: while it is advantageous for each actuated element to have a sufficiently small footprint to be easily and unobtrusively worn and transported, the actuators are also designed to produce enough displacement to be tactilely detected by human fingertips and generate enough force to provide resistance to fingertip pressure. Limiting the cost of each actuator also serves to limit the cost of the final product, which incorporates multiple actuators. Moreover, given that portable, battery-powered applications represent a significant share of the market, it is advantageous to limit the power consumption of each actuator to modest levels. The designs described herein can serve the achievement of each of these objectives.

Figure 2:
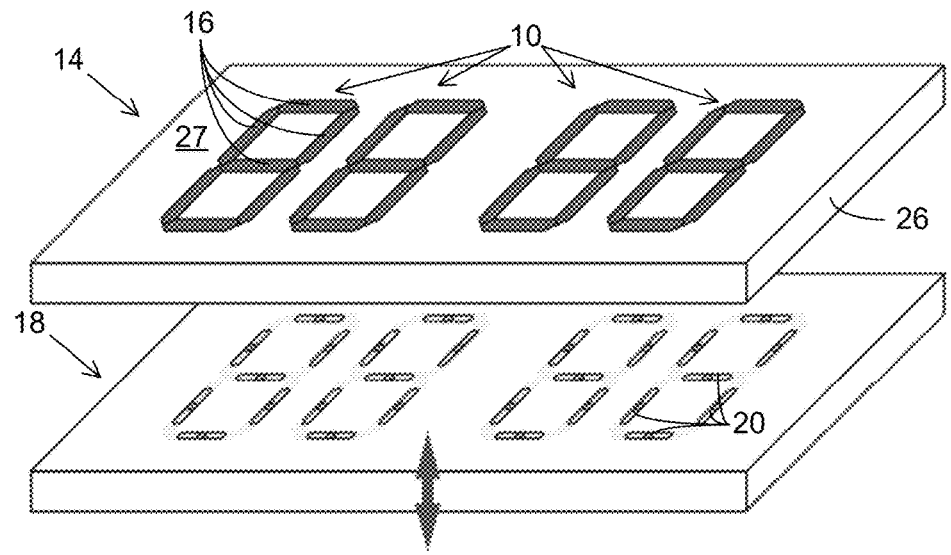
FIG. 2 shows the architecture of tactile display, comprising a stationary display layer 14 with spring-loaded display elements 16, and a moving actuation layer 18 with an array of microactuators. The entire actuation layer 18 is moved by a single mesoactuator (larger displays may require several mesoactuators).
Figure 9:
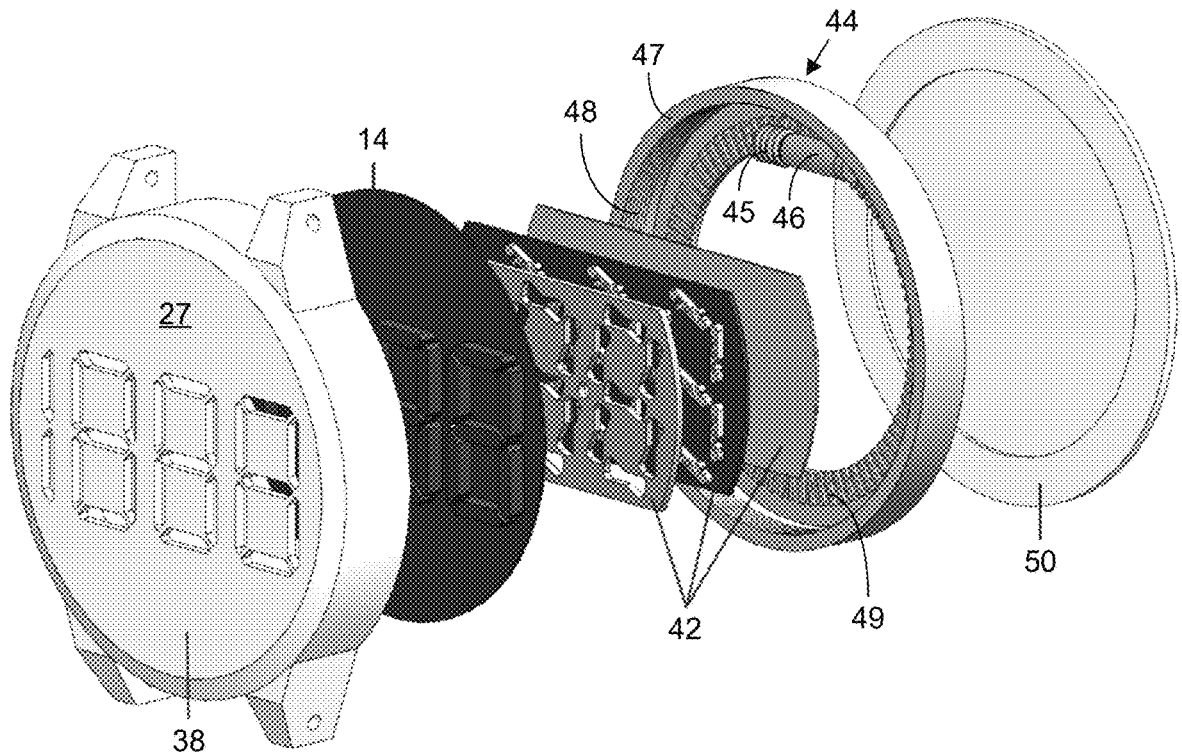
FIGS. 9-11 show an additional embodiment of a segmented alphanumeric display employing an electric motor 46 that turns a ring structure 47 to generate linear displacement via a spiral thread 45 in which the ring 47 is mounted.
Figure 10:
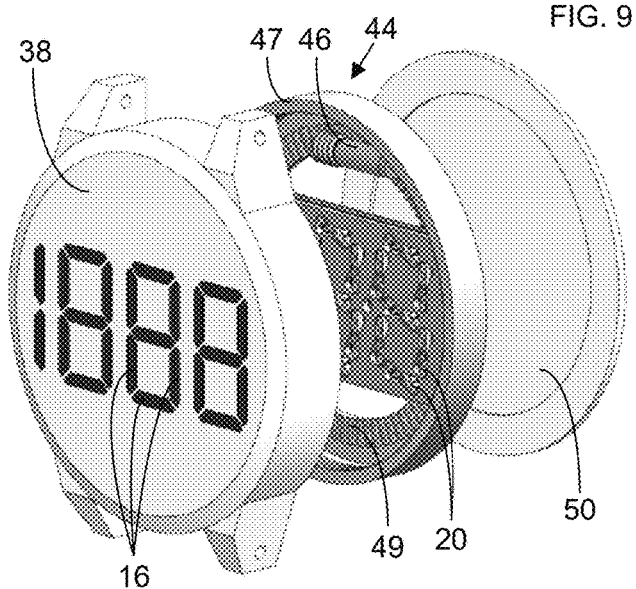

To address these constraints, we developed a dual-mode design concept wherein a single high-force, high-displacement mesoactuator simultaneously engages the entire display module, while an array of compact, low-force, low-displacement microactuators determines the on- or off-state of each individual display element (segment). The mesoactuator can be a motor, with or without gearing, coupled with a linear-motion mechanism that constrains the actuation layer 18 to move prismatically with respect to the display layer 14. A simplified illustration of this approach is shown in FIG. 2. In the system architecture described herein, the entire display module requires only one mesoactuator 44 (an exemplification of which is shown in FIGS. 9 and 10) per several segmented characters, which substantially reduces its impact on overall device cost and enables the use of a commercial off-the-shelf (COTS) component, such as an electric motor with a linear transmission stage. The arrays 10 of display elements 16 each can produce, e.g., a letter or number and can have a width (measured left-to-right in the orientation shown) in a range from, e.g., 8-10 mm and a height in a range from, e.g., 16-20 mm. The actuation components of the actuation layer 18 can be configured to displace the display elements 16 to protrude, e.g., 0.5 to 1.0 mm beyond an outer surface 27 of the display panel 26 when extended via the actuation, while the display elements 16 remain flush with the outer surface 27 when not actuated (in an inactive state).

Figures 3, 4, 5:
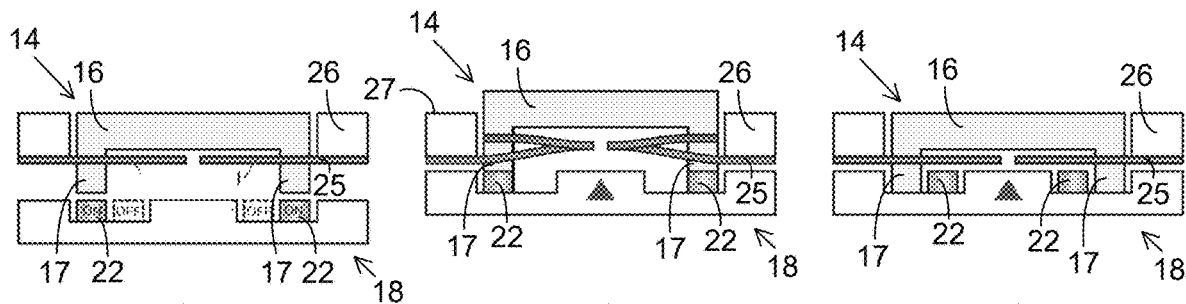
FIGS. 3-5 show interaction between a display layer 14 and an actuation layer 18. In the inactive state (FIG. 3), the actuation layer 18 and display layer 14 are separated. In the active state, the two layers 14 and 18 are brought together by a high-force, high-displacement mesoactuator. Depending on the state of the microactuator associated with each display element 16, the display element 16 is either pushed out of the display surface 27 (FIG. 4) or remains flush with the surface 27 (FIG. 5).

An exemplification of the display layer 14 and how it interacts with the actuation layer 18 is shown in FIGS. 3-5. Each display element 16 is molded onto a section of a flat (e.g., photo-etched) spring 25 and incorporates protrusions 17 that allow it to interact with a single microactuator in the actuation layer 18. When the microactuator is in the active state (as shown in FIG. 4), it will engage with these protrusions 17 when the actuation layer 18 is brought into contact with the display layer 14 by the mesoactuator, pushing the display element 16 out from the outer surface 27 of the display panel 26. If the microactuator is in the inactive state (as shown in FIG. 5), the display element 16 will remain flush with the outer surface 27 of the display panel 26.

Each display element 16 can further incorporate a light source (e.g., one or more light-emitting diodes) that is turned on when the display element 16 is raised. The light source may be molded inside the display element 16 or may be positioned behind a partially translucent portion of the display element 16. This incorporation of a light source provides a combined tactile and visual display. In alternative exemplifications, the array 10 of display elements 16 may be manufactured in the form of molded silicone or other polymer, in a manner similar to silicone keypads. Such a component can also incorporate the spring-back functionality, eliminating the need for a photoetched spring.

A key part of the design effort has been an early emphasis on cost and manufacturability. Many tactile actuation concepts, particularly in the field of refreshable braille displays, have failed to progress from the prototype stage due to excessive manufacturing costs. Although such costs can be expected to fall with production volume, assistive technologies for the visually impaired have not historically commanded a sufficiently large market to capitalize on the benefits of high-volume manufacturing. Consequently, we limited our focus to designs that could be realized in a cost-effective manner at low to medium production volumes. The design configurations described herein can meet these manufacturing restrictions while maintaining the desired level of functionality and reliability. Exemplifications of the microactuator can comprise a compact, low-power electromagnetic actuator array that can be manufactured using existing commercial processes (e.g., stamping, injection molding, and photoetching) and equipment lines (e.g., PCB pick & place, pin insertion, and lamination).

Figure 6:
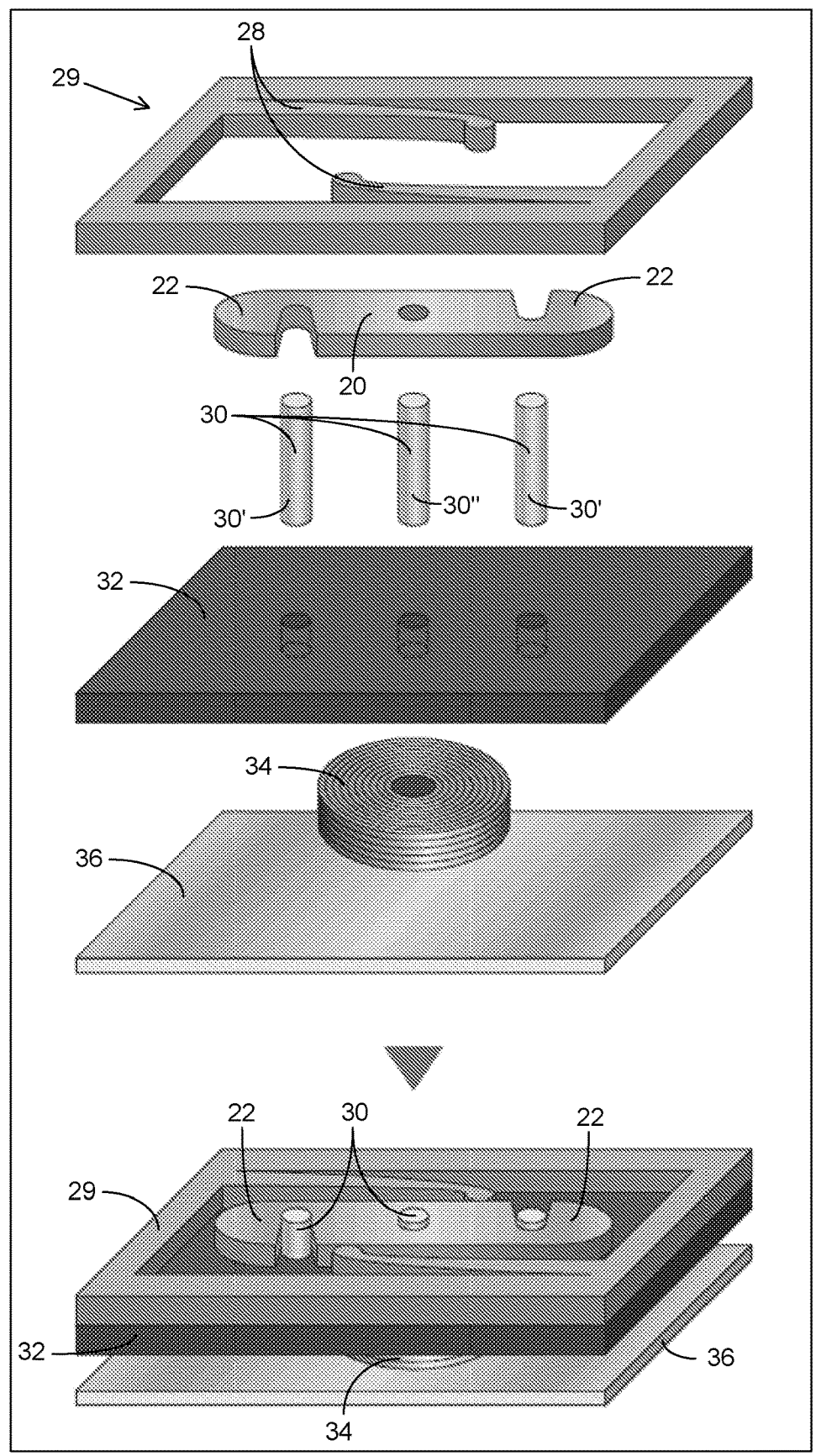
FIG. 6 shows an exploded view and an assembled view of a single microactuator.
Figure 7:
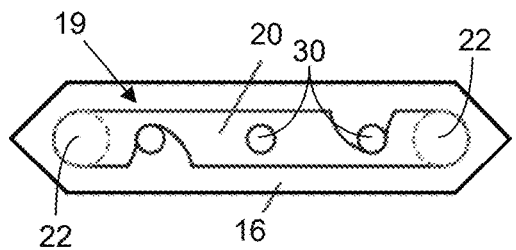
FIGS. 7 and 8 show a top view of a microactuator 19 positioned atop a display element 16.
Figure 8:
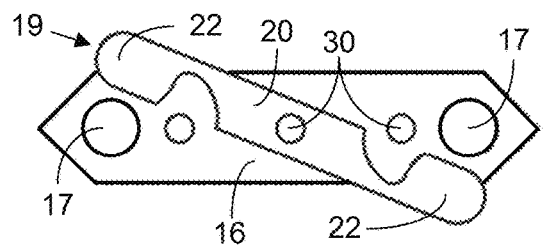

A representative exemplification of a single microactuator is shown in FIG. 6. A pin-insertion machine is used to position three pins 30 made of a magnetic material (e.g., a magnetic grade of stainless steel) within a printed-circuit-board (PCB) substrate 32 including an electrically insulating layer and electrically conductive pathways printed on or in the electrically insulating layer and in electrical contact with the pins 30 and with the coils 34. A free-wound or bobbin-supported miniature microactuator coil 34 is deposited by pick and place on the central pin 30" on the bottom side of the PCB 32, and a backplate 36 (serving as a linearly actuated platform) made of a magnetic material with a composition similar to that of the pins 30 provides a path for the magnetic flux to flow between the pins 30. In various embodiments, the microactuator coils 34 can be manufactured by winding or by etching a multilayer PCB substrate 32. The backplate 36 may be shared among multiple microactuators. A rotor 20 that is also made of a similar magnetic material (e.g., manufactured by stamping, fine-blanking, or photoetching) is placed on the top side of the PCB 32, using the central pin 30" as the axis of rotation. An injection-molded plastic layer 29, which may be shared between multiple microactuators, incorporates return spring elements 28 that keep the rotor 20 a fixed distance away from the outer pins 30' (i.e., in the inactive state). When electrical current from a voltage source is passed through the coil 34, a magnetic force is induced between the associated rotor 20 and outer pins 30'. When properly designed and dimensioned, the rotor 20 then overcomes the force of the return springs 28 and moves a short distance to make contact with the outer pins 30' (i.e., in the active state). When the coil 34 is de-energized by removing the applied voltage, the associated rotor 20 rotates back to the inactive state via the applied force of the return spring 28 without the countering force from the applied voltage. The depictions of the microactuator 19 in FIGS. 7 and 8 illustrate how the position of the rotor 20 in the active state (FIG. 7) and inactive state (FIG. 8) enables its interaction with the protrusions 17 on the display elements 16.

In the exemplification shown in FIG. 6, the microactuator is unidirectional; and an injection-molded return spring 28 provides a restoring force. In an alternative embodiment, the microactuator may be bidirectional. In this alternative exemplification, two coils 34 are placed on the outer pins 30', as shown in FIGS. 26-31) instead of placing a single coil 34 on the central pin 30", and the design of the rotor 20 is modified such that the rotor 20 may only make contact with one of the outer pins 30' at a given time. Energizing one of the associated coils 34 causes the rotor 20 to be preferentially attracted to the pin 30 associated with the coil 34. This configuration removes the need for a return spring 28, at the cost of an additional coil 34 and associated drive circuitry.

In yet another alternative embodiment, the injection-molded plastic layer can incorporate additional functionality that relates to reducing the power consumption of the display. When the actuation layer 18 is in the inactive position (i.e., not in contact with the display layer 14), the return springs 28 may be reconfigured (e.g., by an additional mechanical feature protruding from the device frame) to hold the microactuators in the active state, where the rotor 20 is in close proximity to the outer pins 30'. This design allows the microactuator to exert the maximum possible holding force for a particular energizing current. When the actuation layer 18 is moved towards the active position by the mesoactuator, the return springs 28 return to their default configuration, wherein they try to force each microactuator to the inactive state.

Figure 11:
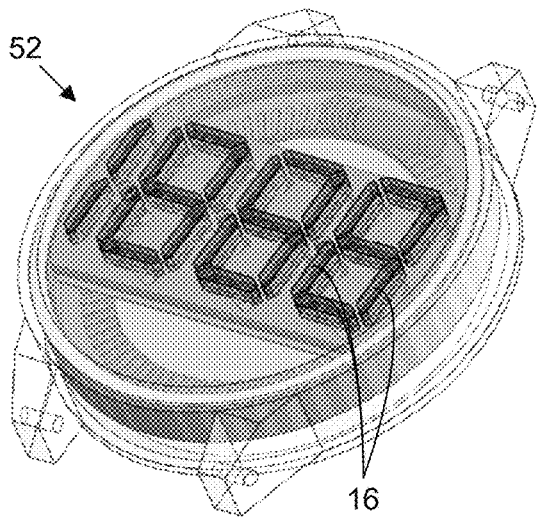

An additional embodiment is shown in FIGS. 9-11, where the mesoactuator 44 includes an electric motor 46 that rotates a lead screw 45 that displaces a grooved band 49 with which it is engaged to turn a ring structure 47 with threads 48 on the inside surface (essentially an inverse lead screw). These threads 48 drive the microactuator array 42 toward or away from the watch face 27 depending on which way the motor 46 turns. The opposite side (from the watch face 27) of the device 52 that incorporates the display is enclosed by a cover plate 50.

While any device or appliance with an alphanumeric display represents a potential target application for incorporation of the apparatus described herein for tactile interaction with a user (e.g., providing information from the device to the user), particular promise lies in assistive devices worn or carried outside of the home, where talking devices may be undesirable to the user or less effective due to ambient noise. These portable devices include:

wristwatches: tactile timepieces currently exist in the form of analog watches that allow the user to directly touch the hands and dial; however, these timepieces tend to be fragile and necessitate high fingertip sensitivity;

activity and fitness trackers: the emerging field of connected health and a growing emphasis on health data collection are expected to lead to a growing adoption of wearable technologies by seniors;

portable glucometers: diabetic retinopathy is one of the leading causes of blindness, accounting for 12% of all new cases in the US; and accessible smart watches: the design principles of a segmented display may be used to realize a more-complex device that combines timekeeping, activity tracking, and discrete tactile notifications from a wirelessly connected accessible phone.

Figure 12:
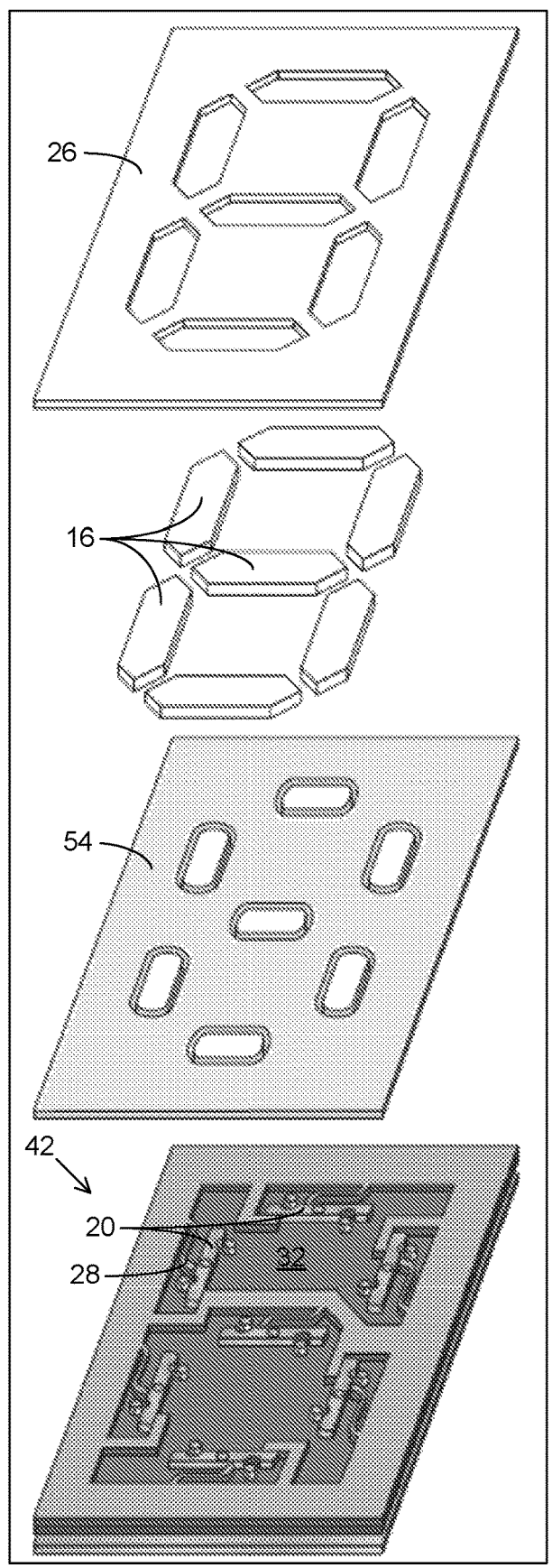
FIG. 12 is an exploded view of an elastomeric keypad assembly, including a display panel 26 (top), display elements 16 (second from top), an elastomeric keypad layer 54 (third from top), and a microactuator array 42 (bottom).

An exploded view of an elastomeric keypad assembly, including a display panel 26 (top), display elements 16 (second from top), an elastomeric keypad layer 54 (third from top), and a microactuator array 42 (bottom) is shown in FIG. 12. A cross-sectional side view of the elastomeric keypad assembly is shown in FIG. 13.

FIGS. 14 and 15, respectively, show a cross-sectional side view and a top view of the microactuator 19 of the elastomeric keypad assembly of FIGS. 12 and 13 with the rotor 20 and display element 16 aligned in the active state (i.e., wherein the contact portions 22 of the rotor 20 is aligned for contact with the display elements 16 to produce displacement thereof).

FIGS. 16 and 17, respectively, offer a cross-sectional side view and a top view of the elastomeric keypad assembly of FIGS. 12-15 with the rotor 20 and display element 16 aligned in the inactive state (i.e., wherein the rotor 20 is rotated to position its contact portions 22 to avoid contact with the display elements 16 to thereby avoid displacing the display elements 16 when actuated).

Figure 18:
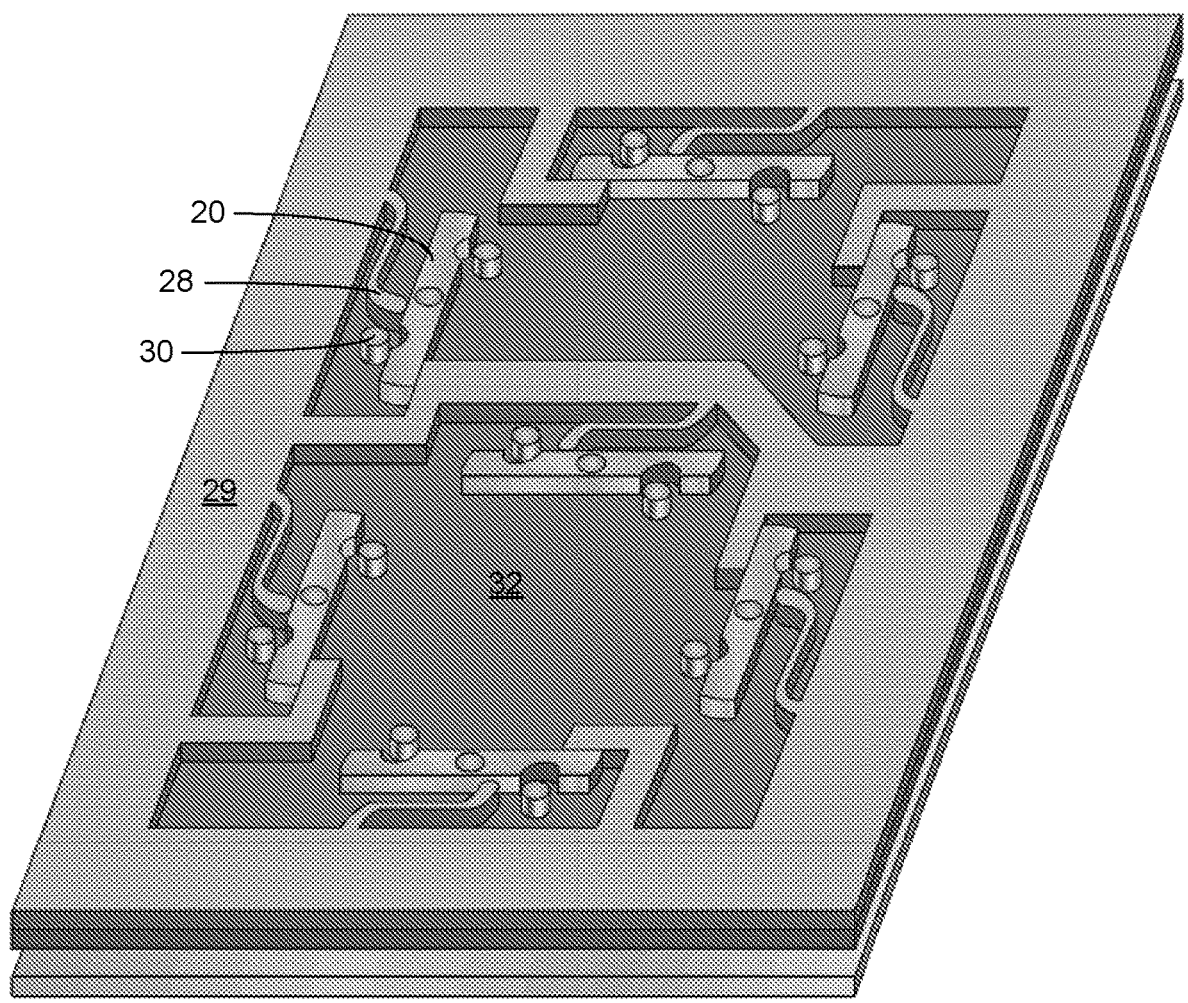
FIG. 18 is a perspective view of a microactuator assembly showing the pins 30 and rotors 20 on a printed circuit board 32.

A perspective view of a microactuator assembly showing the pins 30 and rotors 20 on a printed circuit board 32 is provided in FIG. 18. This entire assembly can be actuated (i.e., displayed toward the display layer 14) by a single mesoactuator.

Figure 19:
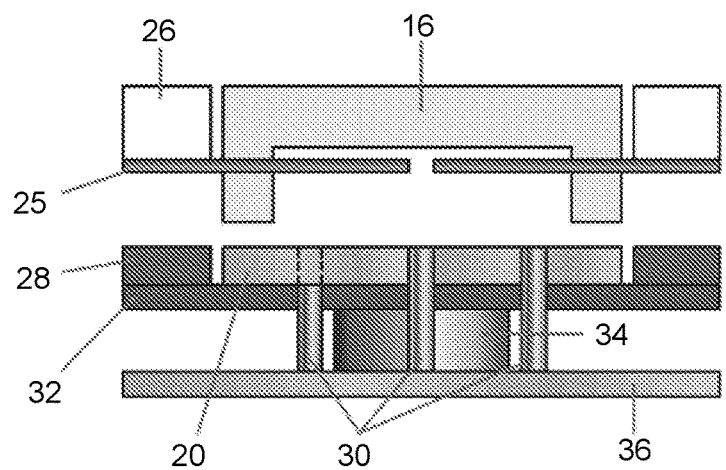
FIG. 19 is a cross-sectional view of an elastomeric keypad assembly with an over-molded spring 28.
Figure 20:
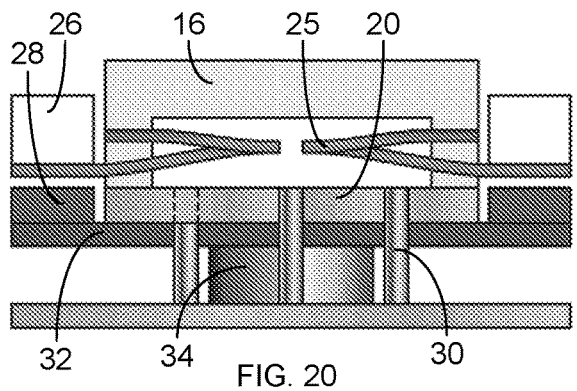
FIGS. 20 and 21, respectively, are a cross-sectional side view and a top view of the elastomeric keypad assembly and over-molded spring 28 of FIG. 13 with the rotor 20 and display element 16 aligned in the active state.
Figure 21:
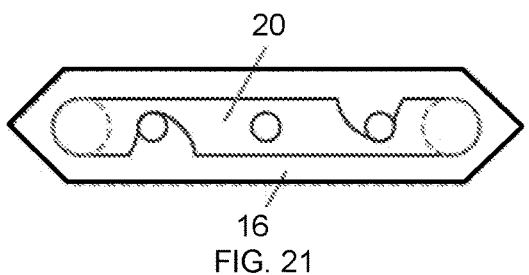
Figure 22:
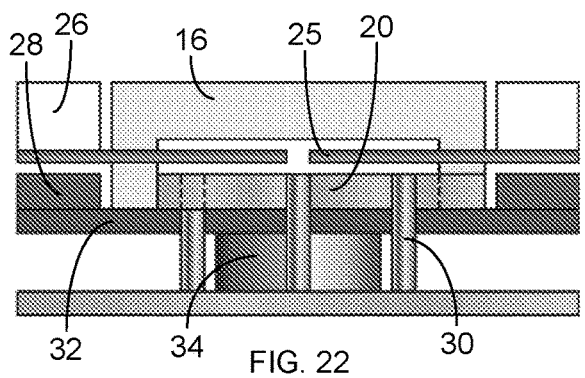
FIGS. 22 and 23, respectively, provide a cross-sectional side view and a top view of the elastomeric keypad assembly and over-molded spring 28 of FIG. 13 with the rotor 20 and display element 16 aligned in the inactive state.
Figure 23:
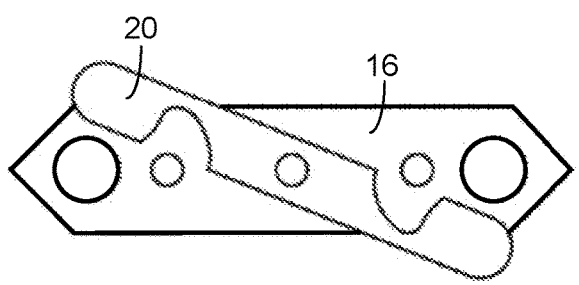

A cross-sectional view of an elastomeric keypad assembly with an over-molded spring 28 and display element 16 is shown in FIG. 19. A cross-sectional side view and a top view of the assembly of FIG. 19 with the rotor 20 and display element 16 aligned in the active state are respectively provided in FIGS. 20 and 21. On the other hand, a cross-sectional side view and a top view of the assembly of FIG. 19 with the rotor 20 and display element 16 aligned in the inactive state are respectively provided in FIGS. 22 and 23.

Figure 24:
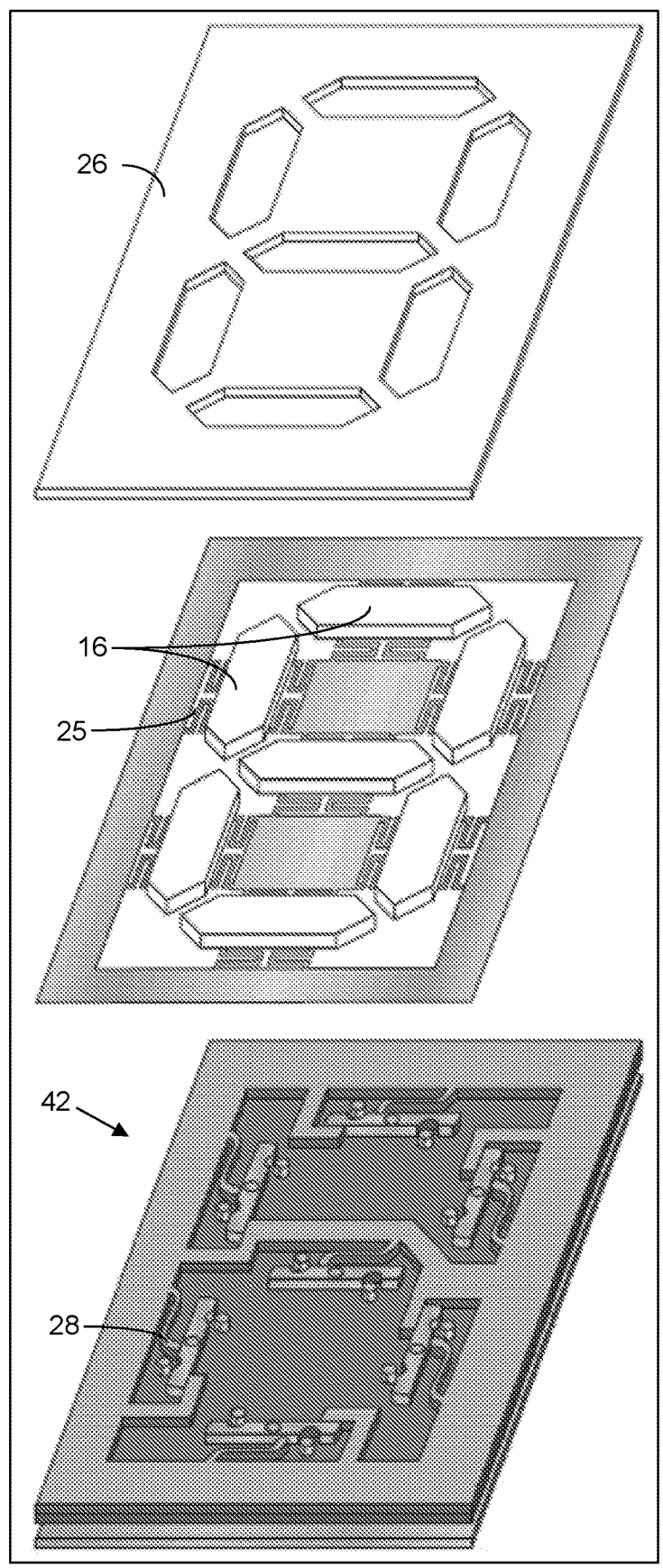
FIG. 24 is an exploded view of an elastomeric keypad assembly with an over-molded spring 28, including a display panel 26 (top), display elements 16 (middle), and a microactuator array 42 (bottom).

An exploded view of an elastomeric keypad assembly with an over-molded spring 28 and including a display panel 26 (top), display elements 16 (middle), and a microactuator array 42 (bottom) is provided in FIG. 24. As seen in FIG. 24, the flat springs 25 are configured to act as a Sarrus linkage to linearly displace the display elements 16 along a single-degree-of-freedom motion.

Figure 25:
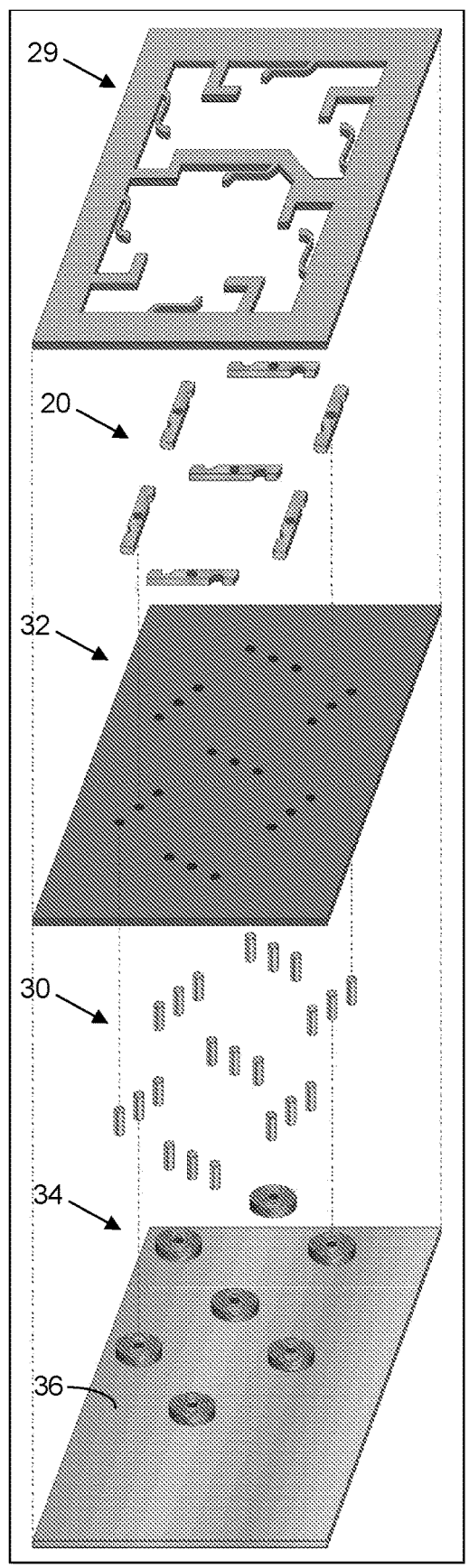
FIG. 25 is an exploded view of a microactuator assembly, including (from top to bottom): a return-spring and motion-stop layer 29; rotors 20, a printed circuit board 32, pins 30, coils 34, and a backplate 36.

FIG. 25 is an exploded view of a microactuator assembly, including (from top to bottom): a return-spring and motion-stop layer 29, rotors 20, a printed circuit board 32, pins 30, coils 34, and a backplate 36. The return-spring and motion-stop layer 29 constrains the rotors 20 and returns them to neutral position when the associated coils 34 are not energized. The rotors 20 interact with the display elements 16 and can be manufactured via stamping, fine-blanking, or photoetching. The coils 34 are positioned and configured to generate magnetic flux in the magnetic circuit formed by the rotor 29, pins 30, and backplate 36; and the backplate 36 serves as a conduit for the magnetic flux.

In an alternative embodiment, the microactuator can be bidirectional. In this alternative embodiment, two coils 34 are placed on the outer pins 30', as shown in FIGS. 26-31, instead of placing a single coil on the central pin 30", and the design of the rotor 20 is modified such that the rotor 20 may only make contact with one of the outer pins 30' at a given time. Energizing one of the coils 34 causes the rotor 20 to be preferentially attracted to the pin 30' associated with the energized coil 34. This configuration offers two advantages. First, it removes the need for a return spring; and, second, it allows the microactuators to be toggled one at a time instead of simultaneously for the entire display. Use of the dual coils 34 can substantially reduce the energy and power requirements for operating the microactuator array, which can be highly beneficial for portable and/or wearable applications.

The embodiment described above makes use of two coils 34 associated with each microactuator and, therefore, 14 coils for a single seven-segment character. In order to reduce the cost of the final device, it may be preferable to implement the coils 34 in a single multi-layer printed circuit board (PCB) 32 as opposed to pre-wound pick-and-place components. Each copper layer of the PCB 32 can incorporate a spiral coil 34 with several turns, and the spiral coils 34 on different layers can furthermore be connected by buried vias to produce coils 34 with an arbitrary number of turns (by introducing additional copper layers to the PCB 32 until the desired number of turns is reached). The microactuator pins 30 are then inserted directly into the appropriate holes in the PCB 32.

Disadvantages of this embodiment include the need for an additional coil 34 and its associated drive circuitry, as well as its increased susceptibility to mechanical shock during the brief time that the display is transitioning from one state to another (the display remains mechanically stable when in the off state, or when actively displaying characters, because each rotor is mechanically engaged with its corresponding display element). Two strategies may be employed to mitigate such mechanical shocks. First, the rotor 20 can be designed such that its center of mass is coincident with its center of rotation. This configuration will virtually eliminate susceptibility to linear forces, leaving only susceptibility to rotational forces (i.e., torques) about the microactuator's center of rotation, which is a rare case for most devices, including wearables. Secondly, the rotor 20 may be manufactured from a material that allows it to retain a small degree of magnetization even when the associated coils 34 are not energized (most magnetic stainless steels will fit this requirement). This will help ensure that the rotor 20 stays "locked" in one of its two possible configurations even in the presence of mechanical shocks because the residual magnetism will cause the rotor 20 to be weakly attracted to whichever pin 30 (and/or associated pole piece 58) is closer.

A top view of the display panel 26 with a magnified view of one of the display elements 16 with two protrusions 17 is shown in FIG. 32. As shown in the illustration of the microactuator 19 in FIG. 33, the rotor 20 is aligned with the protrusions 17 of the display element 16 when the coil 34 associated with the activating pole piece 58' is actuated. As shown in the illustration of the microactuator 19 of FIG. 34, the rotor 20 is misaligned with the protrusions 17 of the display element 16 when the coil 34 associated with the inactivating pole piece 58" is actuated.

In the previously described embodiments, two of the microactuator pins 30' act as magnets or are coupled with magnetic pole pieces 58 that attract the rotor 20. While, from a manufacturing standpoint, it is easiest to use the pins 30' directly without additional components, the circular cross-section of the pin 30' is not always conducive for maximizing the magnetic force, particularly for pins with small diameters. It is possible to increase the efficiency of the microactuators 19, and thereby reduce the power consumption of each microactuator 19 and the display as a whole by introducing specially shaped pole pieces 58 that are coupled to the outer pins 30' (similar to the way that the rotor is coupled to the central pin, except that the pole pieces do not move after installation), as shown in FIGS. 33 and 34.

Figure 35:
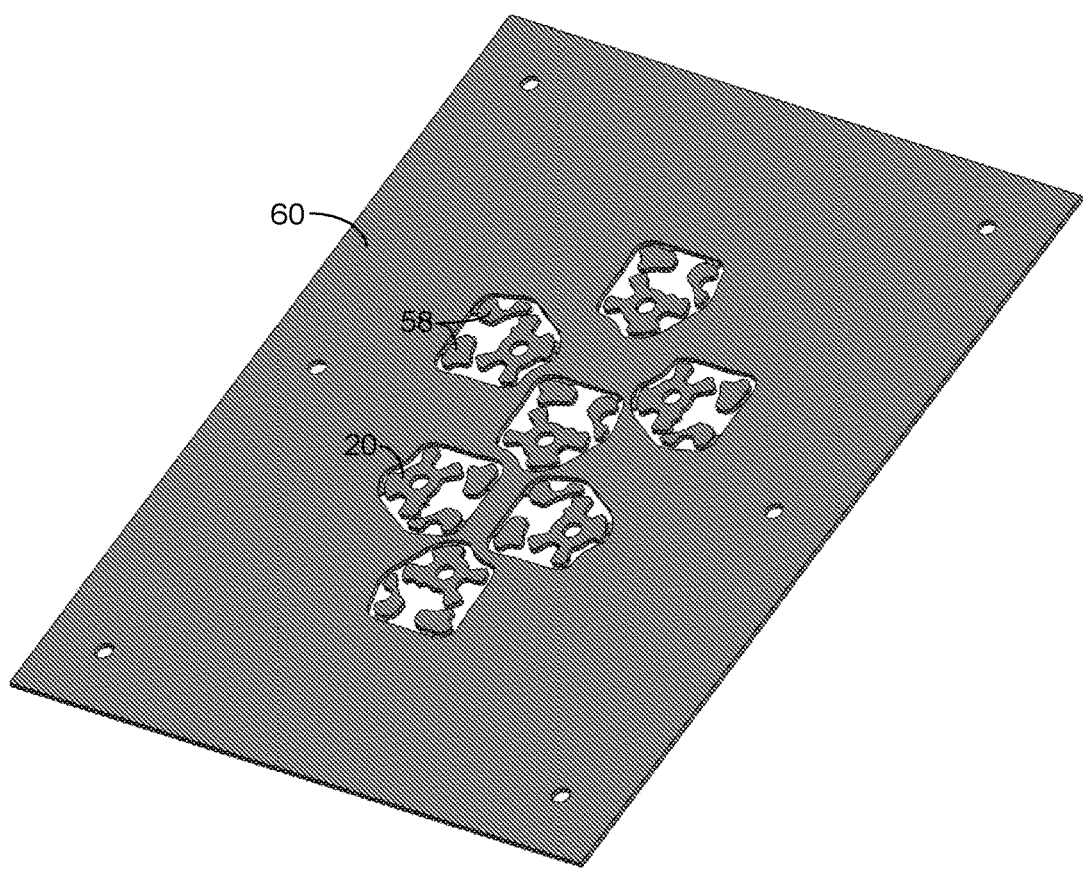
FIG. 35 is a perspective view of a photoetched metal coupon 60 with partially etched retaining tags and with the etched rotors 20 and pole pieces 58 in their desired final positions.

To reduce the manufacturing cost of installing each rotor 20 and pole piece 58, the rotors 20 and pole pieces 58 may be co-fabricated by photoetching a single metal coupon 60, as shown in FIG. 35, where all rotors 20 and pole pieces 58 are positioned as they would be in the final display and attached to the remaining coupon 60 by a partially etched retaining tab that facilitates the removal of the rotors 20 and pole pieces 58 from the remaining coupon 60. The coupon 60 is positioned over and aligned with the underlying pins 30 and rotors 20, and a custom tool is used to press or punch the rotors 20 and pole pieces 58 out of the remaining coupon 60 into their intended positions in the microactuator array, severing the partially etched retaining tabs in the process. The pole pieces 58 and rotors 20 are thereby placed in their final positions in the microactuator array using a parallel operation, compared to a serial process, such as pick and place.

Figure 36:
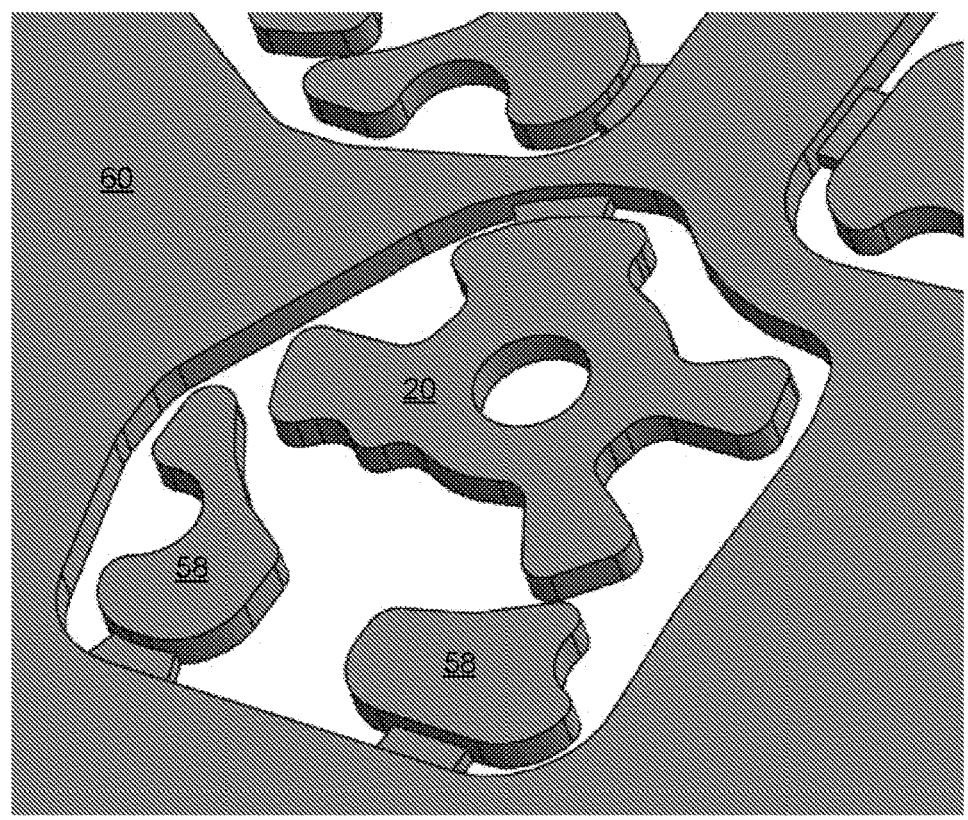
FIG. 36 is a close-up view of the etched rotors 20 and pole pieces 58 in the metal coupon 60 of FIG. 35.

The irregular shapes of the pole pieces 58 and rotors 20, as shown in FIGS. 35 and 36, are due to the following design considerations. First, fitting the required number of microactuators in the array without their magnetic fields interfering with each other, which primarily constrains the position and shape of the pole pieces 58. The position and shape of the pole pieces 58, in turn, affect the optimal shape of the rotor 20. Second, the rotor is designed with features that will maximize the attractive force between parts of the rotor 20 and the pole pieces 58 and also features that mechanically engage (or avoid) the protrusions 17 on the display element 16. Third, the rotor 20 is advantageously designed with its center of mass as close as possible to its axis of rotation; so, after the first two criteria are satisfied, the shape of the rotor 20 is further modified to balance the rotor 20 and make it less susceptible to external shocks. Finally, the rounded corners of the rotors 20 and pole pieces 58 are due to the characteristics of the photoetching process, which naturally rounds sharp corners.

The exemplification described above makes use of two coils 34 for each microactuator 19; and, therefore, 14 coils are employed for a single seven-segment character. In order to reduce the cost of the final device, it may be preferable to implement the coils 34 in a single multi-layer printed circuit board (PCB) 32 as opposed to as pre-wound pick-and-place components. Each copper layer of the PCB 32 can incorporate a spiral coil 34 with several turns, and the spiral coils 34 on different layers can furthermore be connected by buried vias to produce coils 34 with an arbitrary number of turns (by introducing additional copper layers to the PCB 32 until the desired number of turns is reached). The microactuator pins 30 are then inserted directly into the appropriate holes in the PCB 32.

Figure 37:
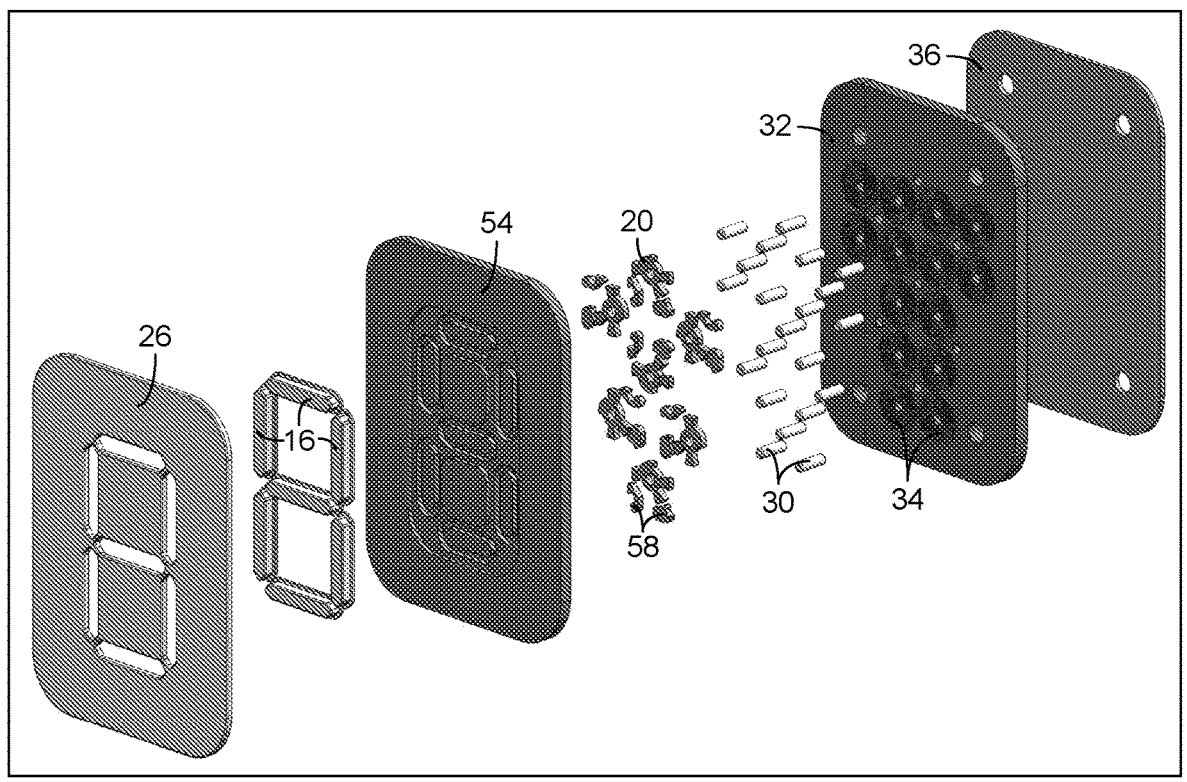
FIG. 37 is an exploded perspective view of a keypad assembly (not including the mesoactuator). Shown from left to right are a display panel (bezel) 26, injection-molded display elements 16, an elastomeric spring layer 54, rotors 20 and pole pieces 58, pins 30, a printed circuit board (PCB) 32 with integrated coils 34, and a backplate 36.

An exploded view of the display panel (bezel) 26, display elements 16, elastomeric keypad layer 54, rotors 20 and pole pieces 58, pins 30, printed circuit board 32 with incorporated coils 34, and backplate 36 are shown in FIG. 37.

Additional examples consistent with the present teachings are set out in the following numbered clauses:

1. A segmented alphanumeric display with electromagnetic microactuators, comprising:
    a display panel including an outer surface and defining at least one orifice;
    at least one linearly actuated platform;
    a plurality of display elements positioned for selective displacement by the linearly actuated platform, each display element configured and positioned to pass through the orifice and to extend beyond the outer surface of the display panel and retract into the display panel through the orifice and to generate protruded and segmented alphanumeric characters in combination with other extended display elements; and
    a microactuator array displaceable by the linearly actuated platform, the microactuator array comprising:
    (a) a plurality of electromagnets; and
    (b) a plurality of rotors, each rotor mounted for rotation in a rotational plane and in at least one direction between an active state and an inactive state by at least one associated electromagnet from among the plurality of electromagnets when the at least one associated electromagnet generates a magnetic field,
    wherein each display element is positioned to be displaced through the orifice by actuation of the linearly actuated platform via a respective rotor from among the plurality of rotors along an axis orthogonal to the rotational plane of its respective rotor when the respective rotor is rotated into its active state and to evade displacement by the rotor when the rotor is rotated into its inactive state.
2. The segmented alphanumeric display of clause 1, further comprising a plurality of return springs, each return spring configured to counteract the rotation of a respective rotor from among the plurality of rotors produced by the at least one electromagnet associated with the respective rotor so as to reverse the position of the respective rotor between the active state and the inactive state.
3. The segmented alphanumeric display of clause 1 or 2, wherein each rotor is configured to be rotated to the active state when its at least one associated electromagnet generates the magnetic field and to be returned to the inactive state by the return spring absent the generation of the magnetic field.
4. The segmented alphanumeric display of any of clauses 1-3, wherein the display elements are configured to produce 7-, 9-, 14- or 16-segment Arabic numerals via extending different combinations of display elements.
5. The segmented alphanumeric display of any of clauses 1-4, wherein each display element is configured to remain flush with an outer surface of the display panel when the respective rotor for the respective display element is in the inactive state irrespective of the linear actuation of the linearly actuated platform.
6. The segmented alphanumeric display of any of clauses 1-5, wherein the linearly actuated platform comprises a linear actuator and a backplate configured to be displaced by actuation of the linear actuator, wherein the microactuator array is mounted to the backplate.
7. The segmented alphanumeric display of any of clauses 1-6, wherein the linear actuator comprises an electric motor configured to rotate at least one lead screw.
8. The segmented alphanumeric display of any of clauses 1-7, further comprising a Sarrus linkage configured to constrain the linearly actuated platform to a single-degree-of-freedom motion.
9. The segmented alphanumeric display of any of clauses 1-8, wherein the linear actuator is configured to generate a force greater than that generated by the microactuator.
10. The segmented alphanumeric display of any of clauses 1-9, wherein the display elements are both tactilely and optically distinguishable from the display panel.
11. The segmented alphanumeric display of any of clauses 1-10, further comprising a light source configured to illuminate display elements that protrude through the display panel.
12. The segmented alphanumeric display of any of clauses 1-11, wherein the microactuator array further comprises at least three pins associated with each rotor, wherein the pins include a central pin on and about which the rotor rotates and outer pins on opposite sides of the central pin, wherein the outer pins are positioned to displace the rotor when the rotor is in the active state and to avoid displacing the rotor when the rotor is in the inactive state.
13. The segmented alphanumeric display of clauses 12, wherein the electromagnets comprise conductive coils.
14. The segmented alphanumeric display of clause 13, wherein respective conductive coils are placed around respective central pins in such a way as to generate an attractive electromagnetic force between the rotors and the outer pins when electric current is passed through the conductive coils.
15. The segmented alphanumeric display of clauses 13 and 14, further comprising a printed circuit board, including an electrically insulating layer and electrically conductive pathways printed on or in the electrically insulating layer, wherein the pins are mounted in or to the printed electrically insulating layer, and wherein the conductive coils are in electrical communication with the electrically conductive pathways.
16. The segmented alphanumeric display clause 13, wherein the pins and rotors each comprise a magnetic or magnetizable material.
17. The segmented alphanumeric display of clause 16, wherein at least some of the conductive coils are configured in pairs, wherein each conductive coil in each pair is positioned and configured to magnetize one of the outer pins when energized, and wherein the outer pins are positioned to displace the rotor to either the active state or the inactive state depending on which outer pin is magnetized.
18. The segmented alphanumeric display of clause 13, further comprising magnetic pole pieces respectively mounted on respective outer pins, wherein the rotor comprises a magnetic or magnetizable material, wherein at least some of the conductive coils are configured in pairs, wherein each conductive coil in each pair is positioned and configured to magnetize one of the outer pins when energized, and wherein the magnetic pole pieces are positioned to displace the rotor to either the active state or the inactive state depending on which magnetic pole is magnetized.
19. The segmented alphanumeric display of any of clauses 1-18, wherein the display panel defines a plurality of orifices, and wherein each display element is positioned to pass through a respective orifice from among the plurality of orifices.
20. The segmented alphanumeric display of any of clauses 1-19, wherein the alphanumeric characters have a width between 8-10 mm and a height between 16-20 mm.
21. The segmented alphanumeric display of any of clauses 1-20, wherein the display elements are configured to protrude 0.5 to 1.0 mm beyond the display panel when extended.
22. The segmented alphanumeric display of any of clauses 1-21, wherein the display elements are configured to extend to a position substantially flush with the outer surface of the display panel when the rotor is in its inactive state.
23. A device selected from a time piece, an activity or fitness tracker, a portable glucometer, and a smartwatch, wherein the device comprises the segmented alphanumeric display of any of the above clauses.
24. A method for generating segmented alphanumeric characters, the method comprising:
utilizing a segmented alphanumeric display that comprises a display panel defining at least one orifice; at least one linearly actuated platform; a plurality of display elements; and a microactuator array, including a plurality of electromagnets and a plurality of rotors, each rotor associated with a respective electromagnet;
energizing at least some of the electromagnets to rotate the respective rotors associated with the energized electromagnets between an inactive state and an active state; and
displacing the linearly actuated platform to displace the microactuator array toward the display panel, wherein rotors that are rotated to their active state displace an associated display element from the plurality of display elements through the orifice to protrude beyond the display panel, and wherein the protruding display elements collectively form a segmented alphanumeric character.
25. The method of clause 24, further comprising displacing the linearly actuated platform to displace the microactuator array away from the display panel to withdraw protruding display elements back into the display panel.
26. The method of clause 24, wherein the energized electromagnets displace their associated rotors to the active state, the method further comprising:
de-energizing the energized electromagnets; and
displacing the rotors that were in the active state to the inactive state with a return spring when the energized electromagnets are de-energized.
27. The method of clause 24, wherein the energized electromagnets displace the respective rotor to the active state, the method further comprising:
de-energizing the energized electromagnets; and
energizing additional electromagnets to displace the rotors that were in the active state back to the inactive state when the initially energy electromagnets are de-energized.
28. The method of any of clauses 24-27, wherein the segmented alphanumeric display is incorporated in a device selected from a time piece, an activity or fitness tracker, a portable glucometer, and a smartwatch.
29. The method of any of clauses 24-28, using the segmented alphanumeric display characterized in any of clauses 1-21.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step. Likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof or within a range of the specified parameter up to or down to any of the variations specified above (e.g., for a specified parameter of 100 and a variation of $1/100^{th}$, the value of the parameter may be in a range from 0.99 to 1.01), unless otherwise specified. Moreover, while this invention has been shown and described with references to particular embodiments thereof, those skilled in the art will understand that various substitutions and alterations in form and details may be made therein without departing from the scope of the invention. Further still, other aspects, functions, and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety for all purposes; and all appropriate combinations of embodiments, features, characterizations, and methods from these references and the present disclosure may be included in embodiments of this invention. Still further, the components and steps identified in the Background section are integral to this disclosure and can be used in conjunction with or substituted for components and steps described elsewhere in the disclosure within the scope of the invention. In method claims (or where methods are elsewhere recited), where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A segmented alphanumeric display with electromagnetic microactuators, comprising:
    a display panel including an outer surface and defining a plurality of orifices;
    at least one linearly actuated platform, wherein the linearly actuated platform comprises a linear actuator and a backplate configured to be displaced by actuation of the linear actuator, wherein the microactuator array is mounted to the backplate;
    a plurality of display elements positioned for selective displacement by the linearly actuated platform, each display element configured and positioned to pass through a respective orifice from among the plurality of orifices and to extend beyond the outer surface of the display panel and retract into the display panel through its respective orifice and to generate protruded and segmented alphanumeric characters in combination with other extended display elements; and
    a microactuator array displaceable by the linearly actuated platform, the microactuator array comprising:
        (a) a plurality of electromagnets; and
        (b) a plurality of rotors, each rotor mounted for rotation in a rotational plane and in at least one direction between an active state and an inactive state by at least one associated electromagnet from among the plurality of electromagnets when the at least one associated electromagnet generates a magnetic field,
    wherein the linear actuator is configured to generate a force greater than that generated by microactuators in the microactuator array, and wherein each display element is positioned to be displaced through its respective orifice by actuation of the linearly actuated platform via a respective rotor from among the plurality of rotors along an axis orthogonal to a rotational plane of its respective rotor when the respective rotor is rotated into its active state and to evade displacement by the rotor when the rotor is rotated into its inactive state.

2. The segmented alphanumeric display of claim 1, further comprising a plurality of return springs, each return spring configured to counteract the rotation of a respective rotor from among the plurality of rotors produced by the at least one electromagnet associated with the respective rotor so as to reverse the position of the respective rotor between the active state and the inactive state.

3. The segmented alphanumeric display of claim 2, wherein each rotor is configured to be rotated to the active state when its at least one associated electromagnet generates the magnetic field and to be returned to the inactive state by the return spring absent the generation of the magnetic field.

4. The segmented alphanumeric display of claim 1, wherein the display elements are configured to produce 7-, 9-, 14- or 16-segment Arabic numerals via extending different combinations of display elements.

5. The segmented alphanumeric display of claim 1, wherein each display element is configured to remain flush with the outer surface of the display panel when the respective rotor for the respective display element is in the inactive state irrespective of the linear actuation of the linearly actuated platform.

6. The segmented alphanumeric display of claim 1, wherein the linear actuator comprises an electric motor configured to rotate at least one lead screw.

7. The segmented alphanumeric display of claim 1, further comprising a light source configured to illuminate display elements that protrude through the display panel.

8. The segmented alphanumeric display of claim 1, wherein the alphanumeric characters have a width between 8-10 mm and a height between 16-20 mm.

9. The segmented alphanumeric display of claim 1, wherein the display elements are configured to protrude 0.5 to 1.0 mm beyond the display panel when extended.

10. The segmented alphanumeric display of claim 1, wherein the display elements are configured to extend to a position substantially flush with the outer surface of the display panel when the respective rotor is in its inactive state.

11. A method for generating segmented alphanumeric characters, the method comprising:
    utilizing a segmented alphanumeric display of claim 1;
    energizing at least some of the electromagnets to rotate the respective rotors associated with the energized electromagnets between an inactive state and an active state; and
    displacing the linearly actuated platform to displace the microactuator array toward the display panel, wherein rotors that are rotated to their active state displace an associated display element from the plurality of display elements through their respective orifices to protrude beyond the display panel, and wherein the protruding display elements collectively form a segmented alphanumeric character.

12. The method of claim 11, further comprising displacing the linearly actuated platform to displace the microactuator array away from the display panel to withdraw protruding display elements back into the display panel.

13. The method of claim 11, wherein the energized electromagnets displace their associated rotors to the active state, the method further comprising:
    de-energizing the energized electromagnets; and
    displacing the rotors that were in the active state to the inactive state with a return spring when the energized electromagnets are de-energized.

14. The method of claim 11, wherein the energized electromagnets displace the respective rotor to the active state, the method further comprising:
    de-energizing the energized electromagnets; and
    energizing additional electromagnets to displace the rotors that were in the active state back to the inactive state when the initially energized electromagnets are de-energized.

15. The method of claim 11, wherein the segmented alphanumeric display is incorporated in a device selected from a time piece, an activity or fitness tracker, a portable glucometer, and a smartwatch.

16. The method of claim 11, wherein the segmented alphanumeric display comprises a Sarrus linkage that constrains the linearly actuated platform to a single-degree-of-freedom motion.

17. The method of claim 11, wherein the microactuator array further comprises at least three pins associated with each rotor, wherein the pins include a central pin on and about which the rotor rotates and outer pins on opposite sides of the central pin, wherein the outer pins displace the rotor when the rotor is in the active state and avoid displacing the rotor when the rotor is in the inactive state.

18. A segmented alphanumeric display with electromagnetic microactuators, comprising:
    a display panel including an outer surface and defining a plurality of orifices;

at least one linearly actuated platform;

a Sarrus linkage configured to constrain the linearly actuated platform to a single-degree-of-freedom motion;

a plurality of display elements positioned for selective displacement by the linearly actuated platform, each display element configured and positioned to pass through a respective orifice from among the plurality of orifices and to extend beyond the outer surface of the display panel and retract into the display panel through its respective orifice through which it is positioned to pass and to generate protruded and segmented alphanumeric characters in combination with other extended display elements; and a microactuator array displaceable by the linearly actuated platform, the microactuator array comprising:

(a) a plurality of electromagnets; and (b) a plurality of rotors, each rotor mounted for rotation in a rotational plane and in at least one direction between an active state and an inactive state by at least one associated electromagnet from among the plurality of electromagnets when the at least one associated electromagnet generates a magnetic field, wherein each display element is positioned to be displaced through its respective orifice by actuation of the linearly actuated platform via a respective rotor from among the plurality of rotors along an axis orthogonal to a rotational plane of its respective rotor when the respective rotor is rotated into its active state and to evade displacement by the rotor when the rotor is rotated into its inactive state.

19. A segmented alphanumeric display with electromagnetic microactuators, comprising:

a display panel including an outer surface and defining a plurality of orifices;

at least one linearly actuated platform;

a plurality of display elements positioned for selective displacement by the linearly actuated platform, each display element configured and positioned to pass through a respective orifice from among the plurality of orifices and to extend beyond the outer surface of the display panel and retract into the display panel through its respective orifice through which it is positioned to pass and to generate protruded and segmented alphanumeric characters in combination with other extended display elements; and a microactuator array displaceable by the linearly actuated platform, the microactuator array comprising:

(a) a plurality of electromagnets;

(b) a plurality of rotors, each rotor mounted for rotation in a rotational plane and in at least one direction between an active state and an inactive state by at least one associated electromagnet from among the plurality of electromagnets when the at least one associated electromagnet generates a magnetic field; and (c) at least three pins associated with each rotor, wherein the pins include a central pin on and about which the rotor rotates and outer pins on opposite sides of the central pin, wherein the outer pins are positioned to displace the rotor when the rotor is in the active state and to avoid displacing the rotor when the rotor is in the inactive state, wherein each display element is positioned to be displaced through its respective orifice by actuation of the linearly actuated platform via a respective rotor from among the plurality of rotors along an axis orthogonal to a rotational plane of its respective rotor when the respective rotor is rotated into its active state and to evade displacement by the rotor when the rotor is rotated into its inactive state.

20. The segmented alphanumeric display of claim 19, wherein the electromagnets comprise conductive coils.

21. The segmented alphanumeric display of claim 20, wherein respective conductive coils are placed around respective central pins in such a way as to generate an attractive electromagnetic force between the rotors and the outer pins when electric current is passed through the conductive coils.

22. The segmented alphanumeric display of claim 20, further comprising a printed circuit board, including an electrically insulating layer and electrically conductive pathways printed on or in the electrically insulating layer, wherein the pins are mounted in or to the electrically insulating layer, and wherein the conductive coils are in electrical communication with the electrically conductive pathways.

23. The segmented alphanumeric display of claim 20, wherein the pins and rotors each comprise a magnetic or magnetizable material.

24. The segmented alphanumeric display of claim 23, wherein at least some of the conductive coils are configured in pairs, wherein each conductive coil in each pair is positioned and configured to magnetize one of the outer pins when energized, and wherein the outer pins are positioned to displace the rotor to either the active state or the inactive state depending on which outer pin is magnetized.

25. The segmented alphanumeric display of claim 20, further comprising magnetic pole pieces respectively mounted on respective outer pins, wherein the rotor comprises a magnetic or magnetizable material, wherein at least some of the conductive coils are configured in pairs, wherein each conductive coil in each pair is positioned and configured to magnetize one of the outer pins when energized, and wherein the magnetic pole pieces are positioned to displace the rotor to either the active state or the inactive state depending on which magnetic pole is magnetized.

* * * * *